(12) United States Patent
Ockenfuss et al.

(10) Patent No.: US 12,055,911 B2
(45) Date of Patent: Aug. 6, 2024

(54) METHOD FOR OFFSET MEASURE COMPENSATION

(71) Applicant: TRUMPF Werkzeugmaschinen SE + Co. KG, Ditzingen (DE)

(72) Inventors: Simon Ockenfuss, Renningen (DE); Harald Mathias, Boennigheim (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 330 days.

(21) Appl. No.: 17/600,707

(22) PCT Filed: Mar. 31, 2020

(86) PCT No.: PCT/EP2020/059036
§ 371 (c)(1),
(2) Date: Oct. 1, 2021

(87) PCT Pub. No.: WO2020/201245
PCT Pub. Date: Oct. 8, 2020

(65) Prior Publication Data
US 2022/0187782 A1    Jun. 16, 2022

(30) Foreign Application Priority Data
Apr. 1, 2019  (DE) ..................... 10 2019 108 388.5

(51) Int. Cl.
*G05B 19/18*   (2006.01)
*B21D 28/04*   (2006.01)
(Continued)

(52) U.S. Cl.
CPC .......... *G05B 19/182* (2013.01); *B21D 28/04* (2013.01); *B21D 28/26* (2013.01); *B23K 26/38* (2013.01);
(Continued)

(58) Field of Classification Search
None
See application file for complete search history.

(56) References Cited

U.S. PATENT DOCUMENTS

| | | | |
|---|---|---|---|
| 5,291,647 A | 3/1994 | Fukasawa et al. | |
| 5,920,483 A | 7/1999 | Greenwood et al. | |
| (Continued) | | | |

FOREIGN PATENT DOCUMENTS

| | | |
|---|---|---|
| DE | 2261389 A1 | 7/1974 |
| DE | 19581537 T1 | 6/1997 |
| (Continued) | | |

OTHER PUBLICATIONS

English translation of DE 10 2011 088673 A1 (Year: 2013).*
English translation of DE 10 2017 126243 A1 (Year: 2018).*

*Primary Examiner* — Ryan A Jarrett
(74) *Attorney, Agent, or Firm* — Laurence A. Greenberg; Werner H. Stemer; Ralph E. Locher

(57) ABSTRACT

A method for recognition and compensation of an offset measure between stamping coordinates of a stamping device and laser coordinates of a laser device in a combined stamping-laser machine for processing a plate-shaped workpiece, particularly a metal sheet, includes introducing a structure into the plate-shaped workpiece by respectively using the stamping device or the laser device. A measurement variable of the introduced structure is determined respectively by the laser device or the stamping device. The measurement variable is compared with an expected variable, and a deviation of the measurement variable from the expected variable corresponds to an offset measure. The offset measure is balanced with the coordinates of the laser device in the laser coordinate system or with the coordinates of the stamping device in the stamping coordinate system in
(Continued)

order to compensate for the offset measure between the stamping coordinates and the laser coordinates.

8 Claims, 8 Drawing Sheets

(51) Int. Cl.
 *B21D 28/26* (2006.01)
 *B23K 26/38* (2014.01)
(52) U.S. Cl.
 CPC .............. *G05B 2219/45234* (2013.01); *G05B 2219/49235* (2013.01); *G05B 2219/50057* (2013.01)

(56) References Cited

U.S. PATENT DOCUMENTS

| | | | |
|---|---|---|---|
| 6,041,271 A | 3/2000 | Lindstrom | |
| 6,175,413 B1 | 1/2001 | Lucas | |
| 6,980,881 B2 | 12/2005 | Greenwood et al. | |
| 8,098,923 B2 | 1/2012 | Bytow | |
| 9,618,649 B2 | 4/2017 | Kerscher | |
| 2018/0136626 A1 | 5/2018 | Gu et al. | |

FOREIGN PATENT DOCUMENTS

| | | |
|---|---|---|
| DE | 102007008699 A1 | 8/2008 |
| DE | 102010028179 A1 | 10/2011 |
| DE | 102010039525 A1 | 2/2012 |
| DE | 102011088673 A1 | 6/2013 |
| DE | 112006000774 B4 | 9/2013 |
| DE | 102017126243 A1 | 5/2018 |
| EP | 0287893 A1 | 10/1988 |
| EP | 06607225 B1 | 3/1997 |
| EP | 0902919 A1 | 3/1999 |
| EP | 1970667 A1 | 9/2008 |
| EP | 2878393 A1 | 6/2015 |
| JP | H03275230 A | 12/1991 |
| JP | 6023654 A | 2/1994 |
| JP | H11277275 A | 10/1999 |
| JP | 2000511827 A | 9/2000 |
| JP | 2001239388 A | 9/2001 |
| JP | 2004216440 A | 8/2004 |
| JP | 2006272539 A | 10/2006 |
| JP | 2006315086 A | 11/2006 |
| JP | 2009279727 A | 12/2009 |
| JP | 2011079037 A | 4/2011 |
| JP | 2014013547 A | 1/2014 |
| WO | 9910136 A1 | 3/1999 |
| WO | 2010044067 A1 | 4/2010 |

\* cited by examiner

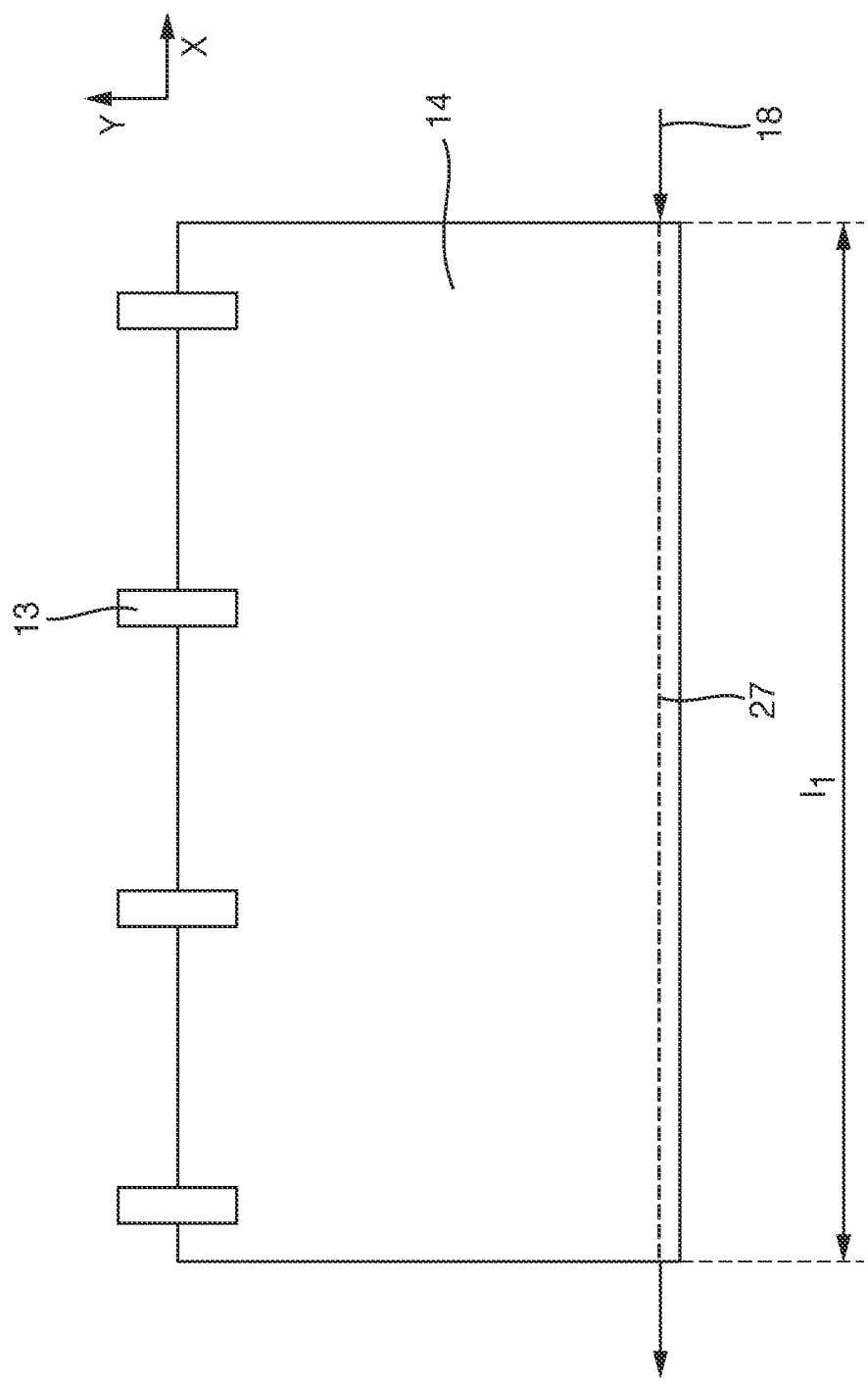

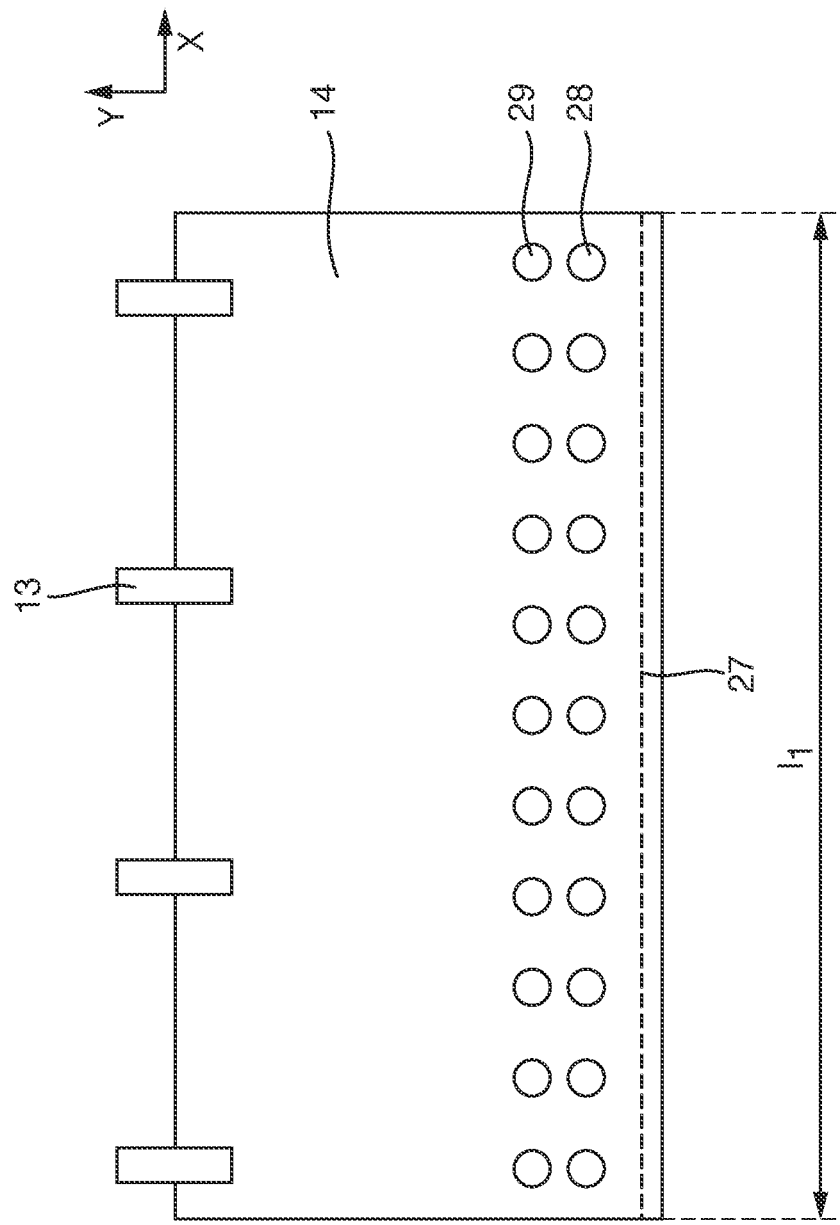

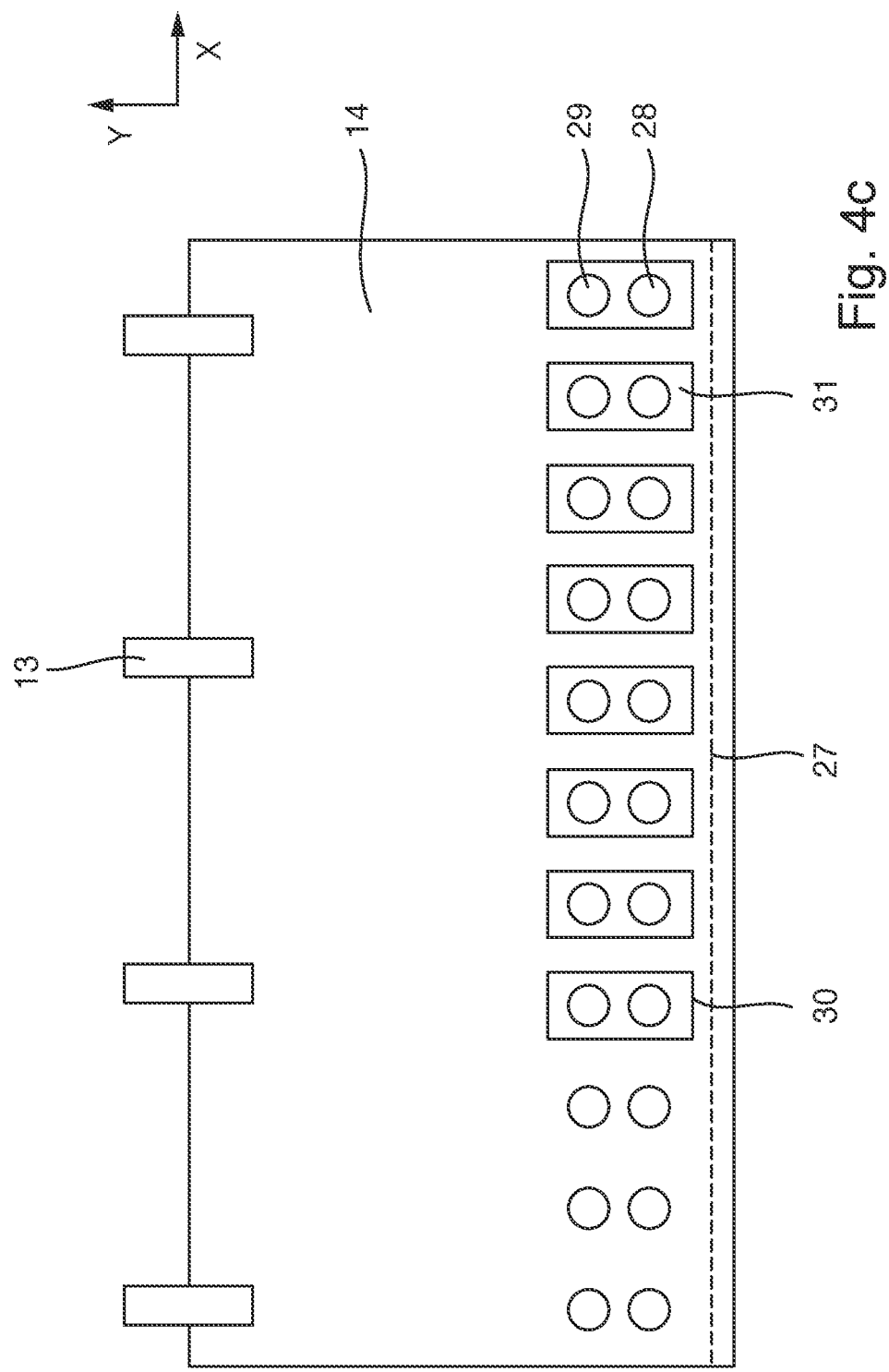

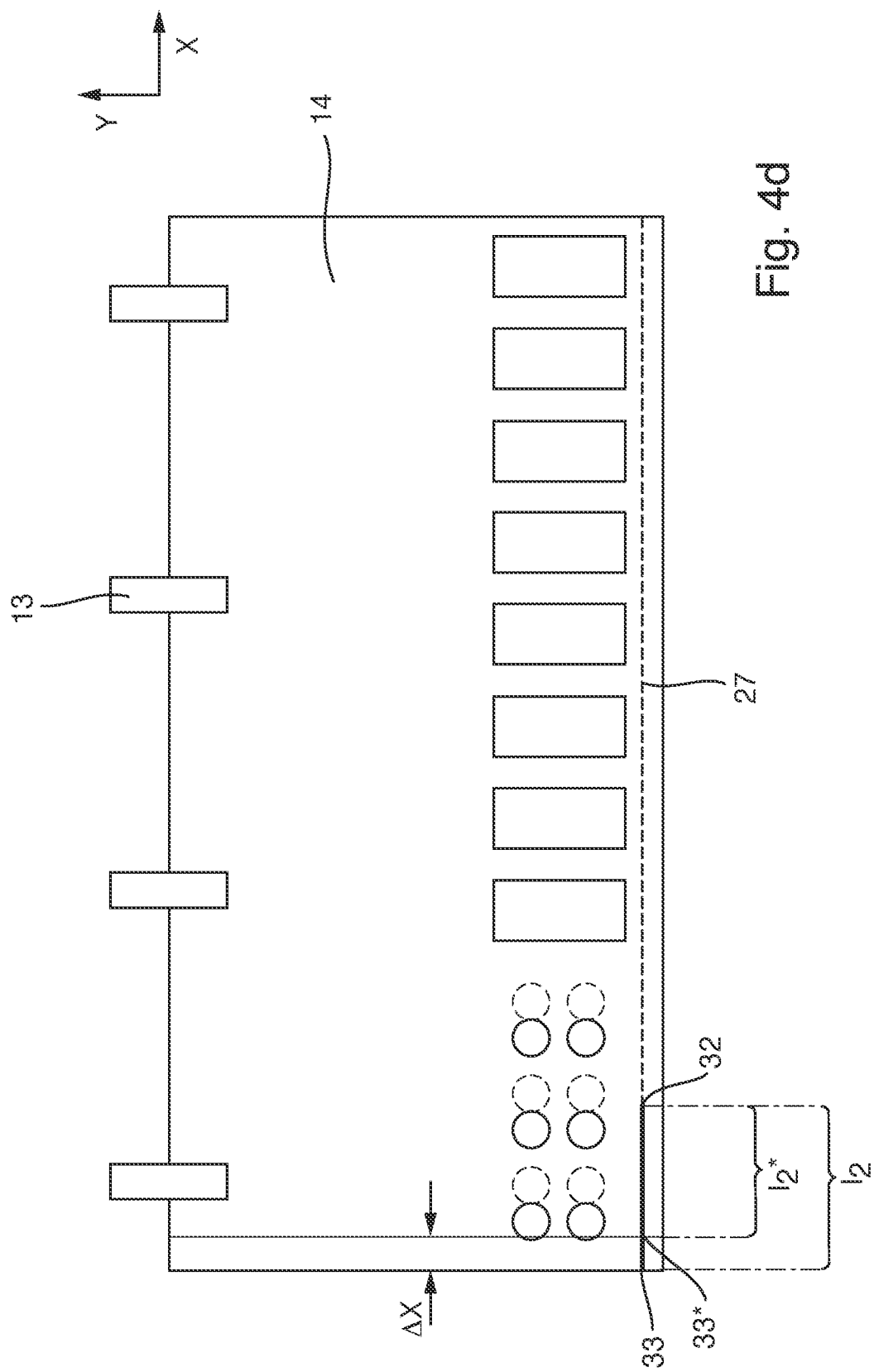

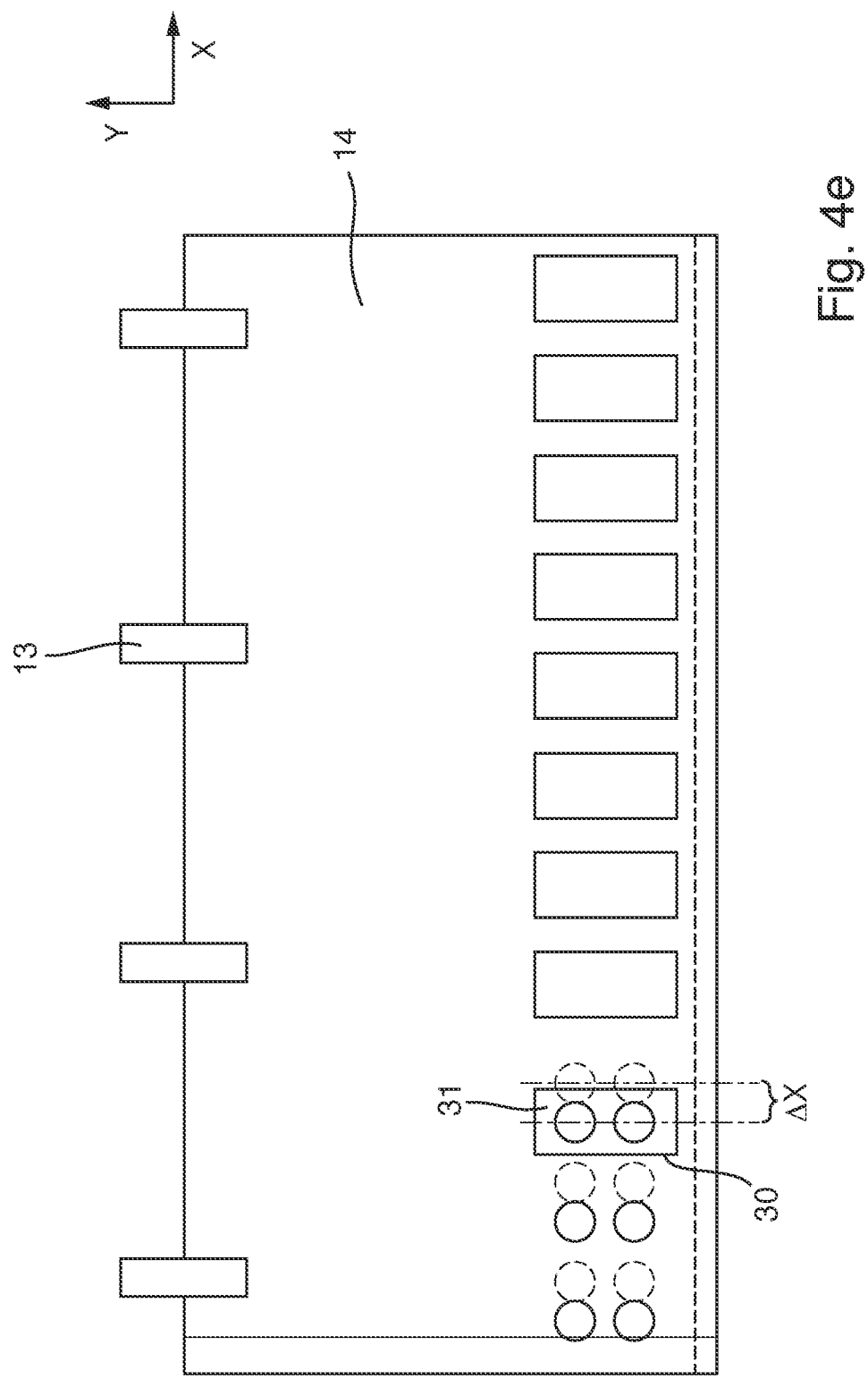

METHOD FOR OFFSET MEASURE COMPENSATION

FIELD AND BACKGROUND OF THE INVENTION

The invention relates to a method for recognition and compensation of an offset measure between the stamping coordinates of a stamping device and the laser coordinates of a laser device in a combined stamping-laser machine. The invention also relates to an associated control device and an associated combined stamping-laser machine. The invention furthermore relates to an associated method for recognition and compensation of an offset measure of a coordinate system of a processing machine for processing a workpiece, an associated control device, and an associated processing machine.

Combined stamping-laser machines have proved successful in recent years particularly for efficiently processing plate-shaped workpieces, in particular metal sheets. In this case, stamping-laser machines can combine advantages of stamping processing with advantages of laser processing. In this regard, for example, standard contours and/or reshapings, such as tabs or threads, can be processed by means of a stamping head of the stamping device. On the other hand, for example, high-quality exterior contours and/or filigree interior contours can be cut by the laser beam of the laser device. Stamping-laser machines are used in particular for sheet-metal processing. In order to ensure an exact assignment of the laser processing to the stamping processing in this case, in combined stamping-laser machines the stamping-laser offset is determined manually by a machine operator and then compensated for by the machine operator by way of manual adjustment. This is comparatively complicated and susceptible to errors.

In this case, the stamping-laser offset of a stamping-laser machine can be different depending on the machine and can vary over the time of use for different reasons. This is owing to manufacturing tolerances of the machine elements, thermal expansions of the mechanisms, collisions, manufacturing tolerances for different cutting heads, ageing, and a possible thermal expansion of the processed workpieces over the processing duration, in particular owing to a heat input from the laser radiation.

In other processing machines, too, for processing an, in particular plate-shaped, workpiece, an offset in the coordinate system of the processing machine can arise for example owing to a thermal expansion of the processed workpieces over the processing duration, in particular owing to a heat input during the processing, or owing to a mechanical deformation during the processing.

SUMMARY OF THE INVENTION

The invention is therefore based on the object of enabling a simple and reliable possibility of determining and compensating for an offset in a processing machine.

In particular, the invention is based on the object of ensuring a simpler and more reliable possibility of determining the stamping-laser offset measure and compensating for same in a stamping-laser machine.

Said object is achieved firstly by means of a method having the features of described below.

Accordingly, what is proposed is a method for recognition and compensation of an offset measure between the stamping coordinates of a stamping device and the laser coordinates of a laser device in a combined stamping-laser machine for processing a plate-shaped workpiece, in particular a metal sheet, the method comprising the following steps:
  a. introducing a structure into the plate-shaped workpiece by means of the stamping device or respectively by means of the laser device;
  b. determining a measurement variable of the introduced structure by means of the laser device or respectively by means of the stamping device;
  c. comparing the measurement variable with an expected variable, wherein a deviation of the measurement variable from the expected variable corresponds to an offset measure; and
  d. balancing the offset measure with the coordinates of the laser device in the laser coordinate system or with the coordinates of the stamping device in the stamping coordinate system in order to compensate for the offset measure between the stamping coordinates and the laser coordinates.

The combined stamping-laser machine thus comprises a stamping device and a laser device. According to the invention, a structure is introduced into the workpiece either by means of the stamping device or by means of the laser device. The structure is thus introduced either by stamping or by laser treatment.

A measurement variable is then determined by the respective other device, that is to say either by the laser device or by means of the stamping device. Said measurement variable is thereupon compared with an expected variable. If the variable actually measured, that is to say the measurement variable, deviates from the expected variable, then the deviation corresponds to an offset measure between the laser coordinates in the laser coordinate system and the stamping coordinates in the stamping coordinate system.

In this case, the coordinates in the laser coordinate system and in the stamping coordinate system may already have been compensated with respect to one another by a hitherto previously known offset measure. Accordingly, an offset measure determined in accordance with the method could also be referred to as an error in the currently set offset measure and the coordinates of the laser device in the laser coordinate system or alternatively the coordinates of the stamping device in the stamping coordinate system can then be compensated by said error. In other words: A determined offset measure represents a deviation by which the known and set offset between the laser and stamping coordinates deviates from the actual offset between the laser and stamping coordinates.

In this case, the stamping coordinates in the stamping coordinate system are programmed positions (X- and Y-positions in the coordinate system) on the workpiece at which a structure is intended to be stamped into the workpiece by means of the stamping device. The laser coordinates are accordingly programmed positions (X- and Y-positions in the coordinate system) on the workpiece at which a structure is intended to be introduced into the workpiece by laser treatment, in particular by cutting, by means of the laser device.

If there is no offset measure present between stamping device and laser device or correspondingly between stamping processings on the workpiece and laser processings on the workpiece, then either the stamping coordinate system and the laser coordinate system have the same origin or, in particular, the origins are displaced to the correct extent relative to one another by a known and correct offset measure.

As already explained, an offset measure is regularly present between the stamping device and the laser device of a stamping-laser machine. Correspondingly, an offset measure is regularly present between stamping processings and laser processings. In this case, said offset measure can be different depending on the machine and can change in particular over the period of use. This may be caused for example by manufacturing tolerances of the machine elements, by a thermal expansion of the mechanisms, by collisions, by manufacturing tolerances for different cutting heads, by ageing and also by a thermal expansion of a workpiece during the processing thereof. According to the invention, said offset measure can now be automatically determined and (re)corrected. In this case, the originally programmed position in the laser coordinates at which a structure is intended to be introduced into the workpiece by means of the laser is corrected by the offset measure. Alternatively, the originally programmed position in the stamping coordinates at which a structure is intended to be introduced into the workpiece by means of the stamping device could also be corrected by the offset measure. Overall, the offset measure can be determined and corrected significantly more rapidly, more simply and with less susceptibility to errors by comparison with manual determination and correction of the offset measure. Furthermore, on account of the more rapid determining process, determination and possible correction of the offset measure can be carried out comparatively frequently, without in so doing adversely affecting the efficiency of the processings of the stamping-laser machine in a relevant way.

One advantageous development of the invention provides that in step a. a perforation is introduced into the workpiece by the stamping device or respectively the laser device, wherein in step b. a point that unambiguously describes the perforation, in particular the center point of the perforation, is determined by means of the laser device or respectively by means of the stamping device, wherein in step c. there is a process of determining whether the position of the determined center point corresponds to the expected position of the center point, and wherein deviation of the determined position from the expected position corresponds to an offset measure, and wherein in step d., in the case of a determined deviation of the actual center point from the expected center point, compensation of the offset measure is carried out by balancing the offset measure with the coordinates of the laser device in the laser coordinate system or with the coordinates of the stamping device in the stamping coordinate system in order to compensate for the offset measure between the stamping coordinates and the laser coordinates.

In this case, the structure is thus embodied as a perforation. The measurement variable is correspondingly the center point of the perforation. In this case, it is conceivable, in particular, for the perforation to be stamped by means of the stamping device and then for the actual center point of the perforation to be determined by means of the laser device. However, the opposite case would also be conceivable.

It is then possible to determine whether the actual position of the center point corresponds to the expected, programmed position. In this case, a deviation corresponds to an offset measure and the coordinates of the laser device in the laser coordinate system can then be compensated by said offset measure.

A further advantageous configuration of the invention provides that the center point is determined by emission of a detection light beam and, on the basis thereof, detection of emitted or respectively reflected light.

This constitutes a particularly simple way of determining and correcting the offset measure. The center point is accordingly determined by way of an optical measuring method. In this case, the detection light beam can be in particular a laser light beam that is radiated onto the workpiece. On the basis thereof, it is then possible either to detect the emitted process light of the workpiece, that is to say the emission of light by the hot workpiece owing to the incident laser radiation. Additionally or alternatively, it is also possible to determine reflected laser radiation. As long as the detection light beam is incident on the workpiece itself in this case, it is possible to detect a comparatively strong detection light signal owing to the emitted or respectively reflected light of the workpiece. By contrast, as soon as the perforation is reached, the strength of the detected signal collapses since the detection light beam then radiates through the perforation. The opposite situation correspondingly prevails in the opposite direction of travel, that is to say beginning in the perforation with a direction of movement toward the workpiece. Initially no or a very small signal is detected. As soon as the workpiece is reached by the detection light beam, however, a prominent signal is detected. In this way, the center point of the perforation can be determined particularly simply. If the center point is determined by means of the laser device in this case, then the laser beam that is otherwise used for processing the workpiece can generate a corresponding detection light beam in this case. Such a detection device is previously known from DE 10 2010 028 179 A1, for example, the disclosure content of which is fully incorporated in the present application.

Alternatively, it is conceivable for a detection beam to be emitted which is reflected by a reflector below the workpiece. As soon as the workpiece interrupts said beam, the workpiece edge has been reached.

In the case of such a reflected light barrier configuration, the laser light is thus reflected back via the reflector in the perforation region for as long as the beam does not impinge on workpiece material. By contrast, as soon as the beam reaches the workpiece, the beam is interrupted and the workpiece edge has been recognized.

Finally, it would also be conceivable to detect transmitted laser light with the aid of a photodiode below the workpiece. As long as the laser beam shines through the perforation in the workpiece, the photodiode below the workpiece measures the laser radiation. If the laser beam is interrupted upon contacting a workpiece edge, the signal measured by the photodiode below the metal sheet also dips.

If the center point is determined by means of the stamping device, then a reflected light barrier provided on the stamping head or respectively a punch fracture monitoring sensor on the stamping head can be used for this purpose. By means of the reflected light barrier or respectively by means of the punch fracture monitoring sensor, it is otherwise possible to determine whether a stamped-out structure has actually been removed from the workpiece. The reflected light barrier or the punch fracture monitoring sensor can in particular also generate a laser beam, wherein reflected or respectively emitted detection light radiation can be detected for determining the center point. Such a device is previously known from EP 2 878 393 A1, for example, the disclosure content of which is likewise concomitantly incorporated in this application. In this case, too, either the process light of the workpiece, light reflected from a reflector below the workpiece or a signal of a photodiode below the workpiece can be used for determining the center point.

What is advantageous in this context is, in particular, if the perforation is embodied in circular fashion. In this case, the center point can be determined by crosswise displacement of the workpiece relative to the laser device or to the stamping device. Furthermore, the detection light beam can be emitted by means of the laser device or by means of the stamping device. In this way, the center point can be determined in a particularly simple manner. In order in this case to displace the workpiece relative to the laser device or to the stamping device, it is possible for either only the workpiece or the laser device or respectively the stamping device to be moved. It would also be conceivable, however, for both the workpiece and the laser device or respectively the stamping device to be moved, for example along two axes offset by 90°, in order thus to provide the relative displacement. Some stamping-laser machines have redundant axes allowing the laser head to be displaceable (highly dynamically) in a small region, such that it is also conceivable that the laser device can be displaced crosswise relative to the workpiece.

It would be conceivable for the method to be carried out as follows: Firstly, a perforation is stamped into the workpiece. The workpiece is then displaced relative to the laser device such that the detection laser beam radiates through the perforation introduced. The detection laser beam is then displaced relative to the workpiece along a first straight line until the edge of the perforation is reached. Afterward, the laser beam can be displaced again along said first straight line in the opposite direction until the opposite edge is reached. Afterward, the laser beam can be displaced in a manner offset by 90° along a second straight line until an edge is again reached, and then finally in the opposite direction along the second straight line until the opposite edge with respect thereto is reached. As a result, overall a crosswise displacement takes place and the center point of the perforation can thus be determined.

Alternatively, displacement could be effected only once diagonally with respect to the principal axes of the stamping-laser machine in order thus to determine the actual center point.

It is particularly preferred if steps a. to d. according to the invention are carried out in a plurality of workpiece sections of the workpiece, wherein the offset measure is determined for each workpiece section, and wherein the offset measure is balanced with the coordinates of the laser device in the laser coordinate system in each workpiece section in order to compensate for the offset measure between the stamping coordinates and the laser coordinates in the respective workpiece section. The workpiece can thus be subdivided into at least two workpiece sections, but in particular a multiplicity of workpiece sections. In this case, the workpiece sections can in particular be arranged regularly and be of the same size. It is conceivable for the stamping-laser offset measure to vary over the complete workpiece. Determining the offset measure in each workpiece section enables even more accurate processing of the workpiece to take place by virtue of a corresponding local offset measure in the corresponding workpiece section being stored, saved and corrected during a corresponding processing in the workpiece section.

Furthermore, it would be possible, in regions between the workpiece sections for which the offset measure was determined, to interpolate between the offset measures respectively determined in order thus, in particular in each region to be processed, to achieve a particularly accurate offset compensation and nevertheless to attain a comparatively high level of economy in the method.

What is additionally proposed is a method for recognition and compensation of an offset measure between the stamping coordinates of a stamping device and the laser coordinates of a laser device in a combined stamping-laser machine for processing a plate-shaped workpiece, in particular a metal sheet, the method comprising the following steps:

a. introducing a respective structure into the plate-shaped workpiece by means of the stamping device and by means of the laser device;
b. determining measurement variables of the introduced structures by means of the stamping device or by means of the laser device;
c. comparing the measurement variables with expected variables, wherein a deviation of the measurement variables from the expected variables corresponds to an offset measure; and
d. balancing the offset measure with the coordinates in the laser coordinate system in order to compensate for the offset measure between the stamping coordinates and the laser coordinates.

In accordance with this proposal, therefore, both the stamping device and the laser device are used to introduce a structure into the plate-shaped workpiece. The measurement variables of the structures introduced can then be determined either by means of the stamping device or else in particular by means of the laser device. On the basis of this, the actual measurement variables can be compared with expected measurement variables, wherein a deviation corresponds to an offset measure, and wherein the offset measure can be balanced with the coordinates in the laser coordinate system in order to compensate for an offset measure. By this means, too, a determination of the offset measure can be carried out comparatively rapidly and simply. This is effected in this case by a respective structure being introduced by means of the stamping device and the laser device, such that the stamping processing thus introduced can be compared with the laser processing. The determination of the offset measure can be carried out here in this case in particular by means of the stamping device.

It is particularly preferred, furthermore, if in step a. a respective perforation is introduced into the workpiece by the stamping device and by the laser device, wherein in step b. in each case a point that unambiguously describes the perforations, in particular the respective center point of the respective perforation, is determined by means of the laser device or by means of the stamping device, wherein in step c. there is a process of determining whether the position of the determined center points with respect to one another corresponds to the expected position of the center points with respect to one another, wherein a deviation of the determined position of the center points with respect to one another corresponds to an offset measure, and wherein in step d., in the case of a determined deviation of the actual position of the determined center points with respect to one another from the expected position of the center points with respect to one another, compensation of the offset measure is carried out by balancing the offset measure with the coordinates of the laser device in the laser coordinate system in order to compensate for the offset measure between the stamping coordinates and the laser coordinates. Accordingly, firstly two perforations can be introduced into the workpiece. Then the center points can be determined and the actual position of the center point with respect to one another can be compared with the expected position of the center points with respect to one another. In this case, a deviation corresponds to an offset measure by which the coordinates in the laser coordinate system or in the stamping coordinate system can finally be corrected.

Advantageously, the respective center point is determined by emission of a detection light beam and, on the basis thereof, detection of emitted or respectively reflected light. This constitutes a particularly simple way of determining and correcting the offset measure. The respective center point is accordingly determined by way of an optical measuring method. In this case, the detection light beam can be in particular a laser light beam that is radiated onto the workpiece. On the basis thereof, it is then possible either to detect the emitted process light of the workpiece, that is to say the emission of light by the hot workpiece owing to the incident laser radiation. Additionally or alternatively, it is also possible to determine reflected laser radiation. As long as the detection light beam is incident on the workpiece itself in this case, it is possible to detect a comparatively strong detection light signal owing to the emitted or respectively reflected light of the workpiece. By contrast, as soon as the perforation is reached, the strength of the detected signal collapses since the detection light beam then radiates through the perforation. The opposite situation correspondingly prevails in the opposite direction of travel, that is to say beginning in the perforation with a direction of movement toward the workpiece. Initially no or a very small signal is detected. As soon as the workpiece is reached by the detection light beam, however, a prominent signal is detected.

In this way, the center point of the perforation can be determined particularly simply. If the center point is determined by means of the laser device in this case, then the laser beam that is otherwise used for processing the workpiece can generate a corresponding detection light beam in this case. Such a detection device is previously known from DE 10 2010 028 179 A1, for example, the disclosure content of which is fully incorporated in the present application.

Alternatively, it is conceivable for a detection beam to be emitted which is reflected by a reflector below the workpiece. As soon as the workpiece interrupts said beam, the workpiece edge has been reached.

In the case of such a reflected light barrier configuration, the laser light is thus reflected back via the reflector in the perforation region for as long as the beam does not impinge on workpiece material. By contrast, as soon as the beam reaches the workpiece, the beam is interrupted and the workpiece edge has been recognized.

Finally, it would also be conceivable to detect transmitted laser light with the aid of a photodiode below the workpiece. As long as the laser beam shines through the perforation in the workpiece, the photodiode below the workpiece measures the laser radiation. If the laser beam is interrupted upon contacting a workpiece edge, the signal measured by the photodiode below the metal sheet also dips.

If the center point is determined by means of the stamping device, then a reflected light barrier provided on the stamping head or respectively a punch fracture monitoring sensor on the stamping head can be used for this purpose. By means of the reflected light barrier or respectively by means of the punch fracture monitoring sensor, it is otherwise possible to determine whether a stamped-out structure has actually been removed from the workpiece. The reflected light barrier or the punch fracture monitoring sensor can in particular also generate a laser beam, wherein reflected or respectively emitted detection light radiation can be detected for determining the center point. Such a device is previously known from EP 2 878 393 A1, for example, the disclosure content of which is likewise concomitantly incorporated in this application. In this case, too, either the process light of the workpiece, light reflected from a reflector below the workpiece or a signal of a photodiode below the workpiece can be used for determining the edge.

Preferably, the perforations are embodied in circular fashion. In this case, the respective center point can be determined by crosswise displacement of the workpiece relative to the laser device or to the stamping device. Furthermore, the detection light beam can be emitted by means of the laser device or by means of the stamping device.

In this way, the respective center point can be determined in a particularly simple manner. In order in this case to displace the workpiece relative to the laser device or to the stamping device, it is possible for either only the workpiece or the laser device or respectively the stamping device to be moved. It would also be conceivable, however, for both the workpiece and the laser device or respectively the stamping device to be moved, for example along two axes offset by 90°, in order thus to provide the relative displacement. Some stamping-laser machines have redundant axes allowing the laser head to be displaceable (highly dynamically) in a small region, such that it is also conceivable that the laser device can be displaced crosswise relative to the workpiece.

Alternatively, displacement could be effected only once diagonally with respect to the principal axes of the stamping-laser machine in order thus to determine the actual center point.

A particularly preferred development of the invention results from the fact that steps a. to d. according to the invention are carried out in a plurality of workpiece sections of the workpiece, wherein the offset measure is determined for each workpiece section, and wherein the offset measure is balanced with the coordinates of the laser device in the laser coordinate system in each workpiece section in order to compensate for the offset measure between the stamping coordinates and the laser coordinates in the respective workpiece section. The workpiece can thus be subdivided into at least two workpiece sections, but in particular a multiplicity of workpiece sections. In this case, the workpiece sections can in particular be arranged regularly and be of the same size. It is conceivable for the stamping-laser offset measure to vary over the complete workpiece. Determining the offset measure in each workpiece section enables even more accurate processing of the workpiece to take place by virtue of a corresponding local offset measure in the corresponding workpiece section being stored, saved and corrected during a corresponding processing in the workpiece section.

Furthermore, it would be possible, in regions between the workpiece sections for which the offset measure was determined, to interpolate between the offset measures respectively determined in order thus, in particular in each region to be processed, to achieve a particularly accurate offset compensation and nevertheless to attain a comparatively high level of economy in the method.

The object on which the invention is based is also achieved by means of a control device, embodied and configured for carrying out an abovementioned method according to the invention.

Finally, the object on which the invention is based is also achieved by means of a combined stamping-laser machine, comprising an above-mentioned control device according to the invention.

What is furthermore proposed is a method for recognition and compensation of an offset measure of a coordinate system of a processing machine for processing a plate-shaped workpiece, in particular a metal sheet, the method comprising the following steps:

a. introducing a structure into the workpiece (14) by means of the processing machine and determining a position of the introduced structure in the coordinate system of the processing machine by means of the processing machine;
b. processing the workpiece by means of the processing machine and, after processing progress, once again determining a position of the introduced structure in the coordinate system of the processing machine by means of the processing machine;
c. comparing the determined position with an expected position, wherein a deviation of the determined position from the expected position corresponds to an offset measure; and
d. balancing the offset measure with the coordinates in the coordinate system of the processing machine in order to compensate for the offset measure.

In this case, the offset measure corresponds to a change in position of the introduced structure in the coordinate system of the processing machine during the workpiece processing process by means of the processing machine. In this case, the change in position may be owing in particular to the thermal expansion during the processing process or to a mechanical deformation during the processing process.

Compensation of the change in position thus involves taking account of a change in constitution of the workpiece together with processings already introduced, for example as a result of introduced heat and/or mechanical deformation, during the subsequent processings of the workpiece. The coordinates of the processings that follow an offset measurement and compensation in accordance with the method are thus corrected by the offset measure. Overall, it is possible to compensate for an offset measure between the processings already introduced and the further processings to be introduced.

The structure can be embodied in particular as a perforation. Furthermore, the actual position of the center point of the perforation can be compared with the expected position of the center point of the perforation. The center point can be determined once again in a manner similar to that described above for the other proposals:

Accordingly, the center point can be determined by emission of a detection light beam and, on the basis thereof, detection of emitted or respectively reflected light of the workpiece.

This constitutes a particularly simple way of determining and correcting the offset measure. The center point is accordingly determined by way of an optical measuring method. In this case, the detection light beam can be in particular a laser light beam, emitted by the processing machine, that is radiated onto the workpiece. On the basis thereof, it is then possible either to detect the emitted process light of the workpiece, that is to say the emission of light by the hot workpiece owing to the incident laser radiation. Additionally or alternatively, it is also possible to determine reflected laser radiation. As long as the detection light beam is incident on the workpiece itself in this case, it is possible to detect a comparatively strong detection light signal owing to the emitted or respectively reflected light of the workpiece. By contrast, as soon as the perforation is reached, the strength of the detected signal collapses since the detection light beam then radiates through the perforation. The opposite situation correspondingly prevails in the opposite direction of travel, that is to say beginning in the perforation with a direction of movement toward the workpiece. Initially no or a very small signal is detected. As soon as the workpiece is reached by the detection light beam, however, a prominent signal is detected. In this way, the center point of the perforation can be determined particularly simply. If the center point is determined by means of the laser device in this case, then the laser beam that is otherwise used for processing the workpiece can generate a corresponding detection light beam in this case. Such a detection device is previously known from DE 10 2010 028 179 A1, for example, the disclosure content of which is fully incorporated in the present application.

Alternatively, it is conceivable for a detection beam to be emitted which is reflected by a reflector below the workpiece. As soon as the workpiece interrupts said beam, the workpiece edge has been reached.

In the case of such a reflected light barrier configuration, the laser light is thus reflected back via the reflector in the perforation region for as long as the beam does not impinge on workpiece material. By contrast, as soon as the beam reaches the workpiece, the beam is interrupted and the edge has been recognized.

Finally, it would also be conceivable to detect transmitted laser light with the aid of a photodiode below the workpiece. As long as the laser beam shines through the perforation in the workpiece, the photodiode below the workpiece measures the laser radiation. If the laser beam is interrupted upon contacting a workpiece edge, the signal measured by the photodiode below the metal sheet also dips.

What is advantageous in this context is, in particular, if the perforation is embodied in circular fashion. In this case, the center point can be determined by crosswise displacement of the workpiece relative to the processing machine. Furthermore, the detection light beam can be emitted by means of the processing machine. In this way, the center point can be determined in a particularly simple manner. In order in this case to displace the workpiece relative to the processing machine, it is possible for either only the workpiece or the processing machine to be moved. It would also be conceivable, however, for both the workpiece and the processing machine to be moved, for example along two axes offset by 90°, in order thus to provide the relative displacement.

It would be conceivable for the method to be carried out as follows: After processing progress, the workpiece can be displaced relative to the processing machine such that the detection laser beam radiates through a perforation introduced. The detection laser beam is then displaced relative to the workpiece along a first straight line until the edge of the perforation is reached. Afterward, the laser beam can be displaced again along said first straight line in the opposite direction until the opposite edge is reached. Afterward, the laser beam can be displaced in a manner offset by 90° along a second straight line until an edge is again reached, and then finally in the opposite direction along the second straight line until the opposite edge with respect thereto is reached. As a result, overall a crosswise displacement takes place and the center point of the perforation can thus be determined.

Alternatively, displacement could be effected only once diagonally with respect to the principal axes of the processing device in order thus to determine the actual center point.

It is conceivable for the processing machine to be embodied as a stamping or laser processing machine. In the case of a stamping machine, in particular a mechanical deformation may occur over the processing duration of a workpiece, said mechanical deformation resulting in an offset measure that is corrected according to the invention.

In the case of a laser machine, in particular a thermal expansion owing to the heat introduced may occur over the processing duration of a workpiece, said thermal expansion resulting in an offset measure that is corrected according to the invention.

Advantageously, the processing machine is embodied as a combined stamping-laser machine, wherein the coordinates of the laser device in the laser coordinate system and/or the coordinates of the stamping device in the stamping coordinate system are balanced with the determined offset measure in order to compensate for the offset measure. Accordingly, in particular an offset measure owing to changes in constitution of the workpiece, for example owing to thermal expansion or mechanical deformation, can be compensated for.

This has the following background: In the case of a workpiece, for example a metal sheet, firstly the stamping processings are regularly carried out. Then the laser processings are regularly carried out. By way of example, individual parts comprising stamping processings are successively cut out by means of the laser. A thermal expansion of the workpiece may occur owing to the heat introduced into the workpiece during the laser processing. Over the processing duration this results in a thermal expansion of the workpiece and thus an offset measure by which the actual position of the introduced structure in the workpiece deviates from the expected position. The laser coordinates in the laser coordinate system for the subsequent laser processings can be corrected by said offset measure. It would also be conceivable, particularly if even further stamping processings are introduced into the workpiece, for the stamping coordinates in the stamping coordinate system also to be compensated by the offset measure.

One particularly preferred development of the invention results from the fact that steps a. to d. according to the invention are carried out in a plurality of workpiece sections of the workpiece, wherein the offset measure is determined for each workpiece section, and wherein the offset measure is balanced with the coordinates of the processing machine in each workpiece section in order to compensate for the offset measure in the respective workpiece section. The workpiece can thus be subdivided into at least two workpiece sections, but in particular a multiplicity of workpiece sections. In this case, the workpiece sections can in particular be arranged regularly and be of the same size. It is conceivable for the offset measure to vary over the complete workpiece. Determining the offset measure in each workpiece section enables even more accurate processing of the workpiece to take place by virtue of a corresponding local offset measure in the corresponding workpiece section being stored, saved and corrected during a corresponding processing in the workpiece section.

What is furthermore proposed is a method for recognition and compensation of an offset measure of a coordinate system of a processing machine for processing an, in particular plate-shaped, workpiece, in particular a metal sheet, the method comprising the following steps:

a. measuring the length and/or width of the workpiece,
b. processing the workpiece by means of the processing machine and, after processing progress, once again determining the length and/or width of the workpiece by means of the processing machine;
c. determining a deviation of the determined length and/or width from the expected length and/or width, wherein a deviation of the determined length and/or width from the expected length and/or width corresponds to an offset measure; and
d. balancing the offset measure with the coordinates in the coordinate system of the processing machine in order to compensate for the offset measure.

Thus, firstly the length (X-axis) and/or the width (Y-axis) of the workpiece can be measured.

After processing progress, a renewed measurement of the length and/or width can then be carried out. In this case, the first measurement can be carried out in particular before the beginning of the workpiece processing. The processing of the workpiece can be begun after the initial measurement. After specific processing progress, the length and/or width of the workpiece can then be measured again, in particular by measuring the cutout, wherein a deviation in the actually measured length from the expected length corresponds to an offset measure that can be correspondingly compensated for in the coordinates in the processing machine coordinate system. In this case, a deviation in the length in the X-direction corresponds to an offset measure in the X-direction, while a deviation of the width in the Y-direction corresponds to an offset measure in the Y-direction.

After the correction of the offset measure, the further processing of the workpiece can thus be carried out with a corrected offset measure, so that despite any occurrence of expansion of the workpiece, it is possible to achieve a sufficiently high accuracy of the processing over the processing duration.

In this case, the determination of the length and/or width can once again be carried out in particular by means of an optical method. Accordingly, the length and/or width are/is determined by way of an optical measuring method. In this case, the detection light beam can be in particular a laser light beam that is radiated onto the workpiece. On the basis thereof, it is then possible either to detect the emitted process light of the workpiece, that is to say the emission of light by the hot workpiece owing to the incident laser radiation. Additionally or alternatively, it is also possible to determine reflected laser radiation. As long as the detection light beam is incident on the workpiece itself in this case, it is possible to detect a comparatively strong detection light signal owing to the emitted or respectively reflected light of the workpiece. By contrast, as soon as the end of the workpiece is reached, the strength of the detected signal collapses since the detection light beam is then no longer incident on the workpiece. In this way, the length and/or width can be determined particularly simply. Any corresponding detection light beam can be generated here in this case by means of the laser beam that is otherwise used for processing the workpiece. Such a detection device is previously known from DE 10 2010 028 179 A1, for example, the disclosure content of which is fully incorporated in the present application.

Alternatively, it is conceivable for a detection beam to be emitted which is reflected by a reflector below the workpiece. As long as the beam impinges on the workpiece, no or only a weak signal is detected.

In the case of such a reflected light barrier configuration, however, the laser light is reflected back via the reflector when the beam no longer impinges on a workpiece material. In other words, as soon as the beam has reached the workpiece edge and impinges on the reflector, the signal immediately becomes stronger, and so the reaching of the workpiece edge and thus the length and/or width of the workpiece can be detected.

Finally, it would also be conceivable to detect transmitted laser light with the aid of a photodiode below the workpiece. As long as the laser beam impinges on the workpiece, no signal is measured by the photodiode. As soon as the laser beam passes the workpiece edge, the beam impinges on the photodiode and a signal is detected.

It is conceivable that only a partial length $l_2$ and/or partial width are/is determined in step b., and wherein a deviation of the determined partial length $l_2$ and/or partial width from the expected partial length $l_2*$ and/or partial width is determined in step c. It is conceivable that future processings may still need to be carried out in the region of said partial lengths and/or partial widths. A particularly accurate further processing can thus be carried out by determinations and compensation of the offset measure in these regions.

It is furthermore conceivable for the processing machine to be embodied as a stamping or laser processing machine.

In the case of a stamping machine, in particular a mechanical deformation may occur over the processing duration of a workpiece, said mechanical deformation resulting in an offset measure that is corrected according to the invention.

In the case of a laser machine, in particular a thermal expansion may occur over the processing duration of a workpiece, said thermal expansion resulting in an offset measure that is corrected according to the invention.

It is furthermore conceivable for the processing machine to be embodied as a combined stamping-laser machine, wherein the coordinates of the laser device in the laser coordinate system and/or the coordinates of the stamping device in the stamping coordinate system are balanced with the determined offset measure in order to compensate for the offset measure.

Thus, firstly the length (in the X-axis direction) and/or the width (in the Y-axis direction) of the workpiece can be measured.

After processing progress, a renewed measurement of the length and/or width can then be carried out. In this case, the first measurement can be carried out in particular before or after the stamping processing, but in any case before the laser processing of the workpiece. The laser processing of the workpiece can then be carried out. After specific processing progress, the length and/or width can then be measured again, wherein a deviation in the actually measured length and/or width from the expected length and/or width corresponds to an offset measure that can be correspondingly compensated for in the coordinates in the laser coordinate system. In this case, a deviation in the length in the X-direction corresponds to an offset measure in the X-direction, while a deviation of the width in the Y-direction corresponds to an offset measure in the Y-direction.

After the correction of the offset measure, the further processing of the workpiece can thus be carried out with a corrected offset measure, so that despite any occurrence of thermal expansion of the workpiece on account of the laser processing, it is possible to achieve a sufficiently high accuracy of the processing over the processing duration.

It is conceivable for firstly all of the stamping processings to be introduced into the workpiece after the initial measurement of the length. The laser processings can subsequently be carried out. The laser processings can be effected for example in the X-direction firstly in a first part of the workpiece. After certain processing progress, for example once ⅔ of the processings in the X-direction have been carried out, it is possible to measure the length of the cutout in the last third of the workpiece. If a difference with respect to the original length of the last third of the cutout occurs here, this corresponds to an offset measure in the X-direction that can be corrected for the remaining processing of the last third of the workpiece.

The problem addressed by the invention is also solved by means of a control device, embodied and configured for carrying out one of the methods mentioned above.

Finally, the problem addressed by the invention is also solved by means of a processing machine, in particular a combined stamping-laser machine, laser machine or stamping machine, comprising an abovementioned control device according to the invention.

Further details and advantageous configurations of the invention can be gathered from the following description, on the basis of which the embodiments of the invention illustrated in the figures are described and explained in more detail.

BRIEF DESCRIPTION OF THE FIGURES

FIGS. 4a) to e) show a schematic illustration of a method for recognition and compensation of a stamping-laser offset measure in accordance with a third embodiment.

DETAILED DESCRIPTION OF THE INVENTION

Figure 1:
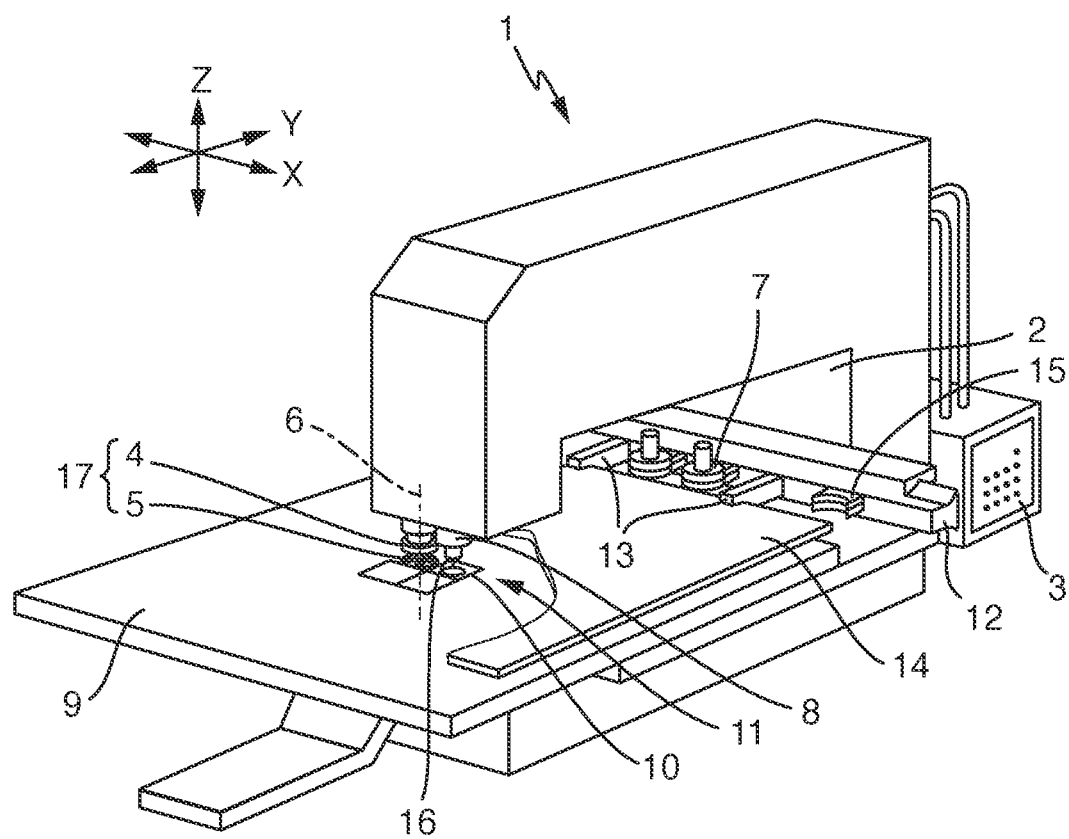
FIG. 1 shows a perspective illustration of a combined stamping-laser machine.

FIG. 1 schematically shows one embodiment of a combined stamping-laser machine 1 with which a workpiece 14, for example in the form of a metal sheet, can both be stamped by means of stamping processing and be processed, in particular cut, by means of laser processing. One part of the processing machine 1 is a C-frame 2. The C-frame 2 consists of a torsionally rigid welded structure made of steel. However, the C-frame 2 can also be embodied in a different form. A control device 3 for controlling the functions of the processing machine 1 is provided at the rear end of the C-frame 2.

The processing machine 1 comprises, at the front inner end of the upper limb of the C-frame 2, a stamping device 17 with an upper tool receptacle 4 and with a lower tool receptacle 5 at the front inner end of the lower limb of the C-frame 2. The upper tool receptacle 4 can receive a tool upper part of a stamping tool 7 and the lower tool receptacle 5 can receive a tool lower part of the stamping tool 7.

The upper tool receptacle 4 is movable in an axial direction (Z-direction) by means of a plunger (not shown) and is controlled with the aid of the control device 3 in such a way that it can both perform a complete stroke and stop in any desired position within its axial stroke path. Furthermore, the upper tool receptacle 4 is optionally rotatable about an axial rotation axis 6, in a manner controlled by the control device 3.

The lower tool receptacle 5 is optionally likewise rotatable about its rotation axis 6. Furthermore, the lower tool receptacle 5 is nonmovable in its axial direction (Z-direction), but can optionally also be embodied as a so-called active die. It can then likewise move in its axial direction and, in a manner controlled by the control device 3, stop in any desired position of its axial stroke path.

Besides the upper tool receptacle 4 and the lower tool receptacle 5, the processing machine 1 also comprises a laser processing device 8 having a laser processing head 16, with which for example the workpiece 14 can be processed, in particular cut. A circular opening 10 is provided in a workpiece table 9 on the inner side of the lower limb of the C-frame 2. The laser processing head 16 is movable in an X-direction and in a Y-direction and also, in order to set a suitable focus position, in the Z-direction by means of a movement unit (not shown). The circular opening 10 substantially defines a processing region 11 of the laser processing head 16.

The workpiece table 9 has a transverse rail 12 with a tool magazine. Clamping jaws 13 for fixedly holding the workpiece 14, which can be present in particular in the form of a sheet-metal plate, are arranged on the transverse rail 12. The clamping jaws 13 can be secured at suitable locations on the transverse rail 12, and can be offset in such a way that the sheet-metal plate 14 is held securely, but the sheet-metal plate 14 is not gripped at an area to be processed. A plurality of, here three, tool receptacles 15 for a plurality of, here two, stamping tools 7 are shown in the tool magazine.

During operation, the workpiece table 9 can be moved into a programmed position for the purpose of stamping in a Y-direction together with the transverse rail 12, to which are secured the clamping jaws 13 used to hold the workpiece 14. The transverse rail 12 can equally be moved into the programmed position in the X-direction, the workpiece 14 sliding over the workpiece table 9. A stamping stroke can then be carried out by the upper tool receptacle 4. After that, the next stamping position can be moved to according to the same principle. The workpiece 14 can be moved to a programmed position according to the same principle in order to carry out laser processing by means of the laser processing machine 8.

In order then to process a workpiece, the following procedure is regularly adapted: Firstly, stamping processings are introduced at programmed positions on the workpiece 14 by means of the stamping device 17. In this case, the positions for the stamping processings are stored as coordinates in a stamping coordinate system. Laser processings can subsequently be carried out by means of the laser processing device 8. In this case, individual parts having a stamping processing are regularly cut out from the workpiece 14 by means of laser cuts. In this case, the laser processings are likewise carried out at programmed positions of the workpiece that are stored in a laser coordinate system.

If there is no offset measure present between the stamping coordinate system and the laser coordinate system, then a point on the workpiece 14 has the same coordinates in both coordinate systems. However, an offset measure regularly occurs between the two coordinate systems. In this case, said offset measure may be different depending on the machine and may vary in particular over the period of use of the combined stamping-laser machine 1. This is owing for example to manufacturing tolerances of the machine elements, thermal expansion of the mechanisms, collisions, manufacturing tolerances for different cutting heads, ageing and heat-dictated expansion of the workpiece 14 during processing, in particular during the laser processings. The stamping-laser offset measure occurring in this way can be stored as an offset measure, wherein the coordinates in the laser coordinate system are balanced with the offset measure, such that the laser processings are also actually carried out at the desired location in the workpiece 14.

Figure 2:
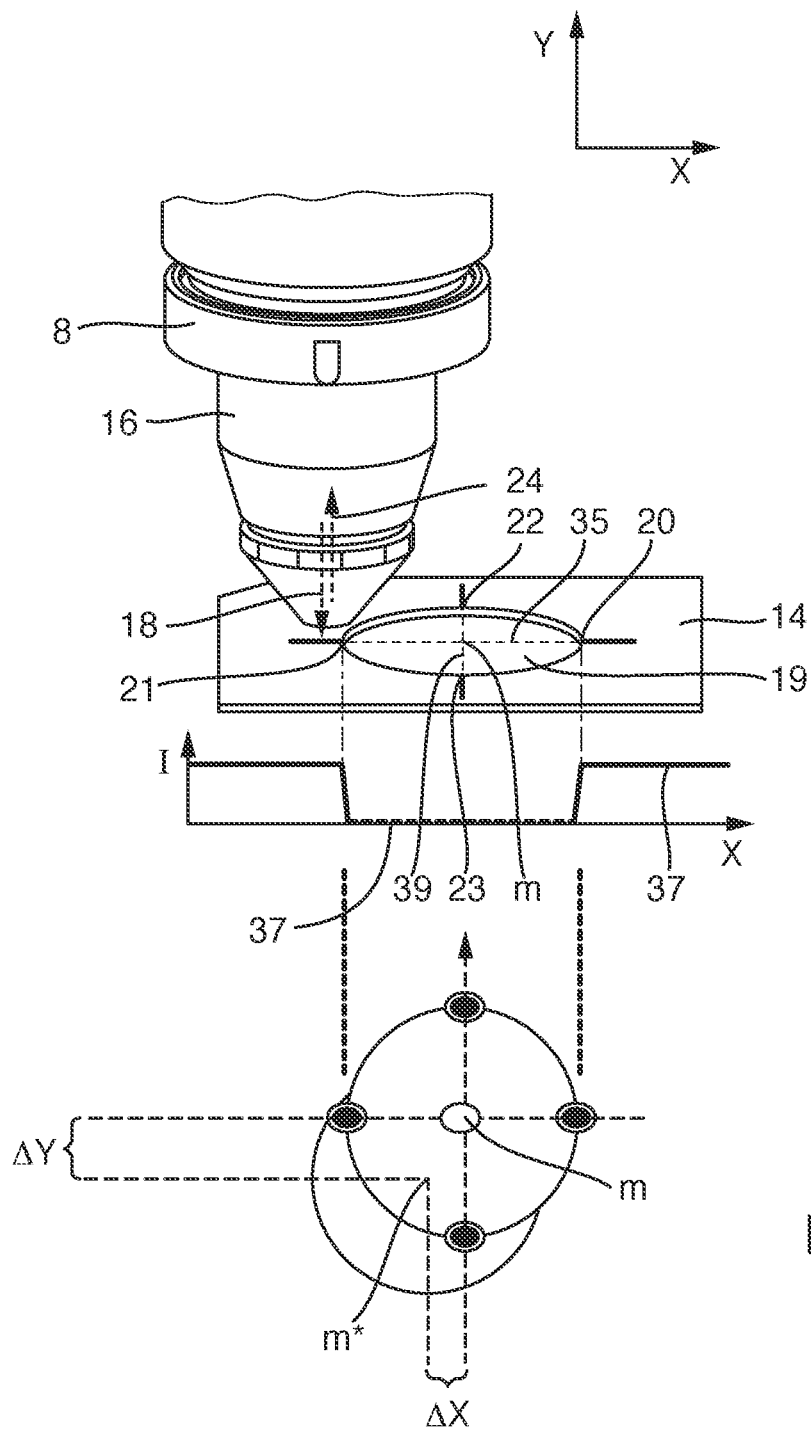
FIG. 2 shows a schematic illustration of a method for recognition and compensation of a stamping-laser offset measure in accordance with a first embodiment.

Three embodiments of a method for automatic recognition and compensation of an offset measure between the stamping coordinates of the stamping device 17 and the laser coordinates of the laser device 8 are set out below:

FIG. 2 shows a first embodiment of the method. If it has been decided that the offset measure is intended to be determined, or whether an offset measure already stored is still correct, then a circular perforation 19, i.e. a hole, is stamped at a defined location on the workpiece 14. As an alternative thereto, such a hole that is already present in the workpiece 14 as stamping processing could be used. The laser processing head 16 is then moved over the hole 19 produced in the workpiece 14. A laser beam 18 is subsequently generated by the laser device 8. If the laser beam 18 directs laser radiation at the workpiece 14, then the workpiece 14 becomes hot, and so the latter emits process light 24. Said process light 24 can be detected. It is thus possible to determine whether the laser radiation 18 is incident on the workpiece 14. Specifically, if the laser beam 18 radiates onto the hole 19, then at least virtually no process light 24 arises and the signal of the process light 24 collapses. A laser processing device 8 with a detection unit for determining the intensity of the process light 24 is previously known from DE 10 2010 028 179 A1, the disclosure content of which in this regard is concomitantly incorporated in the disclosure content of the present application. The laser processing device 8 accordingly comprises such an evaluation unit.

The laser beam 18 is then moved firstly in an X-direction 35, specifically until the signal intensity 37 of the detected process light increases and exceeds a defined threshold value. It is subsequently moved in the opposite direction, once again until the light intensity increases. In this case, an increase in the light intensity indicates that the edge 20, 21 of the hole 19 has been reached. The laser beam 18 is then moved in the Y-direction 39 until the edge 22 of the hole 19 is reached, and it is finally moved in the opposite direction once again until the edge 23 of the hole 19 is reached. Overall, the center point m of the hole 19 can be determined from the coordinates of the edges 20, 21, 22, 23 that have been determined in this way.

The center point m determined in this way has, in the laser coordinate system, the actual coordinates of the center point m on the workpiece 14. Said center point m is then compared with the expected coordinates of the expected center point m*. Said expected center point m* has coordinates in the laser coordinate system which represent the expected position of the center point without (correct) offset measure compensation. In the case shown in FIG. 2, there is an offset measure—not yet corrected—between the stamping coordinates and the laser coordinates by an offset measure ΔX in the X-direction and by an offset measure ΔY in the Y-direction. The programmed coordinates in the laser coordinate system are then (re)corrected in the X- and Y-directions by said offset measure, such that the laser processing by means of the laser beam 18 is carried out exactly at the actually desired location on the workpiece 14.

Figure 3:
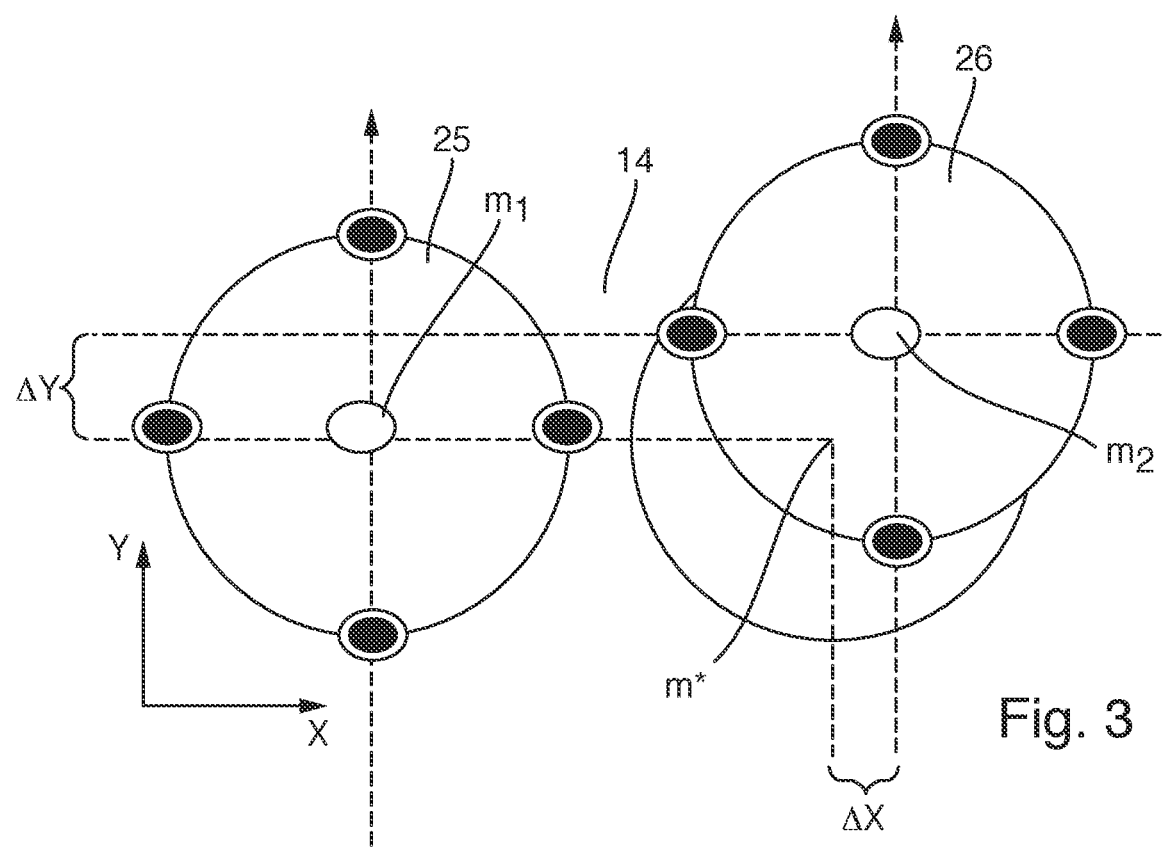
FIG. 3 shows a schematic illustration of a method for recognition and compensation of a stamping-laser offset measure in accordance with a second embodiment.

FIG. 3 shows a second embodiment for determining the stamping-laser offset measure. In this case, firstly a hole 25 is stamped into the workpiece 14 by means of the stamping device 17. In addition, a hole 26 is cut by the laser processing device 8. The offset measure between the two holes can then be determined by means of a detection unit (not shown) arranged at the stamping device 17. Such a detection unit is previously known for example from EP 2 878 393 A1, the disclosure content of which in this regard is fully concomitantly incorporated in the disclosure content of the present patent application.

The method then proceeds as follows: The detection unit in the stamping device 17 comprises means for directing a laser beam at the workpiece 14, and means for detecting the emitted process light of the workpiece or reflected laser light. The actual position of the respective center point is determined, as explained above with regard to FIG. 2, by crosswise displacement of the laser beam and determination of the signal intensity. In this case, the detected radiation intensity collapses when the laser beam is in the region of the hole 25 or respectively the hole 26. A deviation of the position of the actual center points from the expected position of the center points in the stamping coordinate system is determined overall. In the embodiment shown in FIG. 3, in this case the determination is carried out by means of the detection unit of the stamping device 17. Consequently, the center point m1 of the hole 25 is actually where it is expected. However, the center point m2 of the hole 26 is at different coordinates than expected. The center point would have been expected at the coordinates of the position m*. There is thus an offset measure $\Delta X$ in the X-direction and respectively $\Delta Y$ in the Y-direction, which offset measure has not yet been corrected. The coordinates in the laser coordinate system can be (re)corrected by said offset measure in order to compensate for the offset measure.

FIG. 4a shows a workpiece 14 arranged at clamping jaws 13, as described above. Along the length 27 of the workpiece 14 in the X-direction, by means of the laser radiation 18 of the laser processing device 8, the length $l_1$ of the workpiece 14 in the X-direction is then determined by once again analyzing when the intensity of the reflected radiation or of the detected process light collapses.

In a next step, as indicated in FIG. 4b, stamping processings in the form of holes 28, 29 situated next to one another, which are introduced repeatedly into the workpiece 14, are introduced into the workpiece 14. A laser processing of the workpiece 14 then takes place, as is shown in FIG. 4c, wherein a laser cut 30 is carried out in each case around a pair of the holes 28, 29, such that a workpiece part 31 is detached from the workpiece 14. A heat input into the workpiece 14, which can be embodied as a metal sheet, in particular, takes place in the course of this processing. The workpiece 14 expands as a result. This in turn results in an offset measure—not yet corrected—between the stamping coordinates and the laser coordinates, which offset measure is determined and corrected by means of the following method:

As is shown in FIG. 4d, the last section of the workpiece 14 has not yet been processed by means of laser processing. By means of the laser cutting machine 8, the last part of the workpiece 14 is traversed starting from the starting point 32 until the edge 33 is reached, at which the detected light signal collapses, a laser beam being directed at the workpiece 14. On the basis of the previous measurement, a length $l_2$* between the starting point 32 and the expected end point 33* of the workpiece 14 was expected for this. Owing to the thermal expansion, however, the actual end point is at the position 33, such that an actual length 12 is measured. In this respect, there is a difference between the position 33 and the position 33* in the X-direction. Said difference represents an offset measure $\Delta X$ that has not yet been corrected. The coordinates in the laser coordinate system can then be (re)corrected by said offset measure $\Delta X$. As a result, as is shown in FIG. 4e, the laser cut 30 can be carried out at coordinates in the laser coordinate system which have been (re)corrected by the offset measure $\Delta X$, thus resulting in a sufficient production accuracy of the workpiece parts 31 even toward the end of the cutting process.

The embodiment in accordance with FIG. 4 can be used in other processing machines as well. By way of example, offset compensation in pure stamping machines or laser machines would be conceivable. In such processing machines, over the processing duration of a workpiece, owing to thermal expansion, particularly in the case of laser machines, and/or mechanical deformation, particularly in the case of stamping machines, an offset measure (not yet corrected) can occur which can be detected and can be compensated for by way of the procedure shown in FIG. 4. In the case of stamping machines, a detection unit comprising a laser beam source can be provided for determining the offset.

Overall, automatic recognition and compensation of the stamping-laser offset measure in a combined stamping-laser machine 1 can be carried out according to the invention.

This obviates the error-susceptible and complicated manual determination and compensation of the offset measure. It goes without saying, however, that a manual measurement and correction could be carried out as redundancy with respect to the automatic measurement and correction according to the invention.

In accordance with the embodiment according to FIG. 4, it is possible to compensate for a, for example heat- or deformation-dictated, change in constitution of a workpiece during the processing thereof in other processing machines as well, such as pure stamping machines or laser machines, for example.

The invention claimed is:

1. A method for recognition and compensation of an offset measure between stamping coordinates of a stamping device and laser coordinates of a laser device in a combined stamping-laser machine for processing a plate-shaped workpiece or metal sheet, the method comprising:
   a. using the stamping device or the laser device to introduce a structure into the plate-shaped workpiece;
   b. using the laser device or the stamping device to determine a measurement variable of the introduced structure;
   c. comparing the measurement variable with an expected variable to obtain a deviation of the measurement variable from the expected variable corresponding to an offset measure;
   d. balancing the offset measure with the coordinates of the laser device in a laser coordinate system or with the coordinates of the stamping device in a stamping coordinate system to compensate for the offset measure between the stamping coordinates and the laser coordinates,
   in step a. introducing a perforation into the workpiece by using the stamping device or the laser device;
   in step b. determining a point unambiguously describing the perforation or a center point of the perforation, by using the laser device or the stamping device;
   in step c. carrying out a process of determining whether a position of the determined center point corresponds to an expected position of the center point, and obtaining a deviation of the determined position from the expected position corresponding to an offset measure; and
   in step d., upon a determined deviation of the actual center point from the expected center point, carrying out a compensation of the offset measure by balancing the offset measure with the coordinates of the laser device in the laser coordinate system or with the coordinates of the stamping device in the stamping coordinate system to compensate for the offset measure between the stamping coordinates and the laser coordinates.

2. The method according to claim 1, which further comprises determining the center point by emission of a detection light beam and by detection of transmitted, emitted or reflected light based on the detection light beam.

3. The method according to claim 2, which further comprises forming the perforation in circular fashion, determining the center point by crosswise displacement of the workpiece relative to the laser device or to the stamping device, and emitting the detection light beam by using the laser device or the stamping device.

4. The method according to claim 1, which further comprises carrying out steps a. to d. in a plurality of workpiece sections of the workpiece, determining the offset measure for each workpiece section, and balancing the offset measure with the coordinates of the laser device in the laser coordinate system or with the coordinates of the stamping device in the stamping coordinate system in each workpiece section to compensate for the offset measure between the stamping coordinates and the laser coordinates in respective workpiece sections.

5. A method for recognition and compensation of an offset measure between stamping coordinates of a stamping device and laser coordinates of a laser device in a combined stamping-laser machine for processing a plate-shaped workpiece or metal sheet, the method comprising:
  a. introducing a respective structure into the plate-shaped workpiece by using the stamping device and by using the laser device;
  b. determining measurement variables of the introduced structures by using the stamping device or by using the laser device;
  c. comparing the measurement variables with an expected variable to obtain a deviation of the measurement variables from the expected variables corresponding to an offset measure; and
  d. balancing the offset measure with the coordinates of the laser device in the laser coordinate system or with the coordinates of the stamping device in the stamping coordinate system to compensate for the offset measure between the stamping coordinates and the laser coordinates,
  in step a. introducing a respective perforation into the workpiece by using the stamping device and the laser device;
  in step b. determining a point each unambiguously describing the perforations or a respective center point of the respective perforation, by using the laser device or the stamping device;
  in step c. carrying out a process of determining whether the position of the determined center points with respect to one another corresponds to an expected position of the center points with respect to one another, to obtain a deviation of the determined position of the center points with respect to one another corresponding to an offset measure; and
  in step d., upon a determined deviation of the actual position of the determined center points with respect to one another from the expected position of the center points with respect to one another, carrying out compensation of the offset measure by balancing the offset measure with the coordinates of the laser device in the laser coordinate system or with the coordinates of the stamping device in the stamping coordinate system to compensate for the offset measure between the stamping coordinates and the laser coordinates.

6. The method according to claim 5, which further comprises determining the respective center point by emission of a detection light beam and by detection of transmitted, emitted or respectively reflected light based on the detection light beam.

7. The method according to claim 6, which further comprises forming the perforations in circular fashion, determining the respective center point by crosswise displacement of the workpiece relative to the laser device or to the stamping device, and emitting the detection light beam by using the laser device or the stamping device.

8. The method according to claim 5, which further comprises carrying out steps a. to d. in a plurality of workpiece sections of the workpiece, determining the offset measure for each workpiece section, and balancing the offset measure with the coordinates of the laser device in the laser coordinate system or with the coordinates of the stamping device in the stamping coordinate system in each workpiece section to compensate for the offset measure between the stamping coordinates and the laser coordinates in respective workpiece sections.

* * * * *